United States Patent
Teli et al.

(10) Patent No.: US 9,384,094 B2
(45) Date of Patent: Jul. 5, 2016

(54) METHOD AND SYSTEM FOR INSTANT RESTORE OF SYSTEM VOLUME FROM A BACKUP IMAGE

(71) Applicant: Symantec Corporation, Mountain View, CA (US)

(72) Inventors: Ravindra Teli, Pune (IN); Mohammad Eliyas Shaikh, Maharashtra (IN); Chirag Dalal, Pune (IN)

(73) Assignee: VERITAS US IP HOLDINGS LLC, Mountain View, CA (US)

( * ) Notice: Subject to any disclaimer, the term of this patent is extended or adjusted under 35 U.S.C. 154(b) by 435 days.

(21) Appl. No.: 13/736,664

(22) Filed: Jan. 8, 2013

(65) Prior Publication Data
US 2014/0195791 A1 Jul. 10, 2014

(51) Int. Cl.
*G06F 11/14* (2006.01)

(52) U.S. Cl.
CPC ........ *G06F 11/1417* (2013.01); *G06F 11/1469* (2013.01)

(58) Field of Classification Search
CPC ... G06F 9/4401; G06F 11/1417; G06F 11/1469
USPC ........................................................ 713/2
See application file for complete search history.

(56) References Cited

U.S. PATENT DOCUMENTS

| | | | |
|---|---|---|---|
| 6,751,658 B1* | 6/2004 | Haun et al. | 709/222 |
| 6,820,214 B1* | 11/2004 | Cabrera et al. | 714/15 |
| 6,851,073 B1* | 2/2005 | Cabrera et al. | 714/15 |
| 7,353,355 B1* | 4/2008 | Tormasov | G06F 11/1417 707/999.202 |
| 7,398,365 B1* | 7/2008 | Hardman | 711/162 |
| 7,478,117 B1* | 1/2009 | Lamb et al. | |
| 7,480,793 B1* | 1/2009 | Marsh | 713/2 |
| 7,725,704 B1* | 5/2010 | Beaverson et al. | 713/2 |
| 7,979,690 B1* | 7/2011 | Dyatlov et al. | 713/2 |
| 8,006,125 B1* | 8/2011 | Meng et al. | 714/6.12 |
| 8,145,607 B1* | 3/2012 | Korshunov et al. | 707/674 |
| 8,200,637 B1* | 6/2012 | Stringham | 707/670 |
| 8,712,968 B1* | 4/2014 | Chester et al. | 707/649 |
| 8,818,936 B1* | 8/2014 | Haase et al. | 707/610 |
| 8,856,591 B2* | 10/2014 | Wang | G06F 11/1417 714/15 |
| 2003/0046605 A1* | 3/2003 | Qin | 714/13 |
| 2005/0177716 A1* | 8/2005 | Ginter et al. | 713/157 |
| 2006/0018505 A1* | 1/2006 | Cherian et al. | 382/100 |
| 2006/0143501 A1* | 6/2006 | Tormasov et al. | 714/5 |
| 2007/0078801 A1* | 4/2007 | Guruprakash | 707/1 |
| 2007/0271311 A1* | 11/2007 | Ikeda et al. | 707/201 |
| 2008/0040726 A1* | 2/2008 | Xing | 719/312 |
| 2008/0201536 A1* | 8/2008 | Hars | 711/154 |

(Continued)

*Primary Examiner* — Thomas Lee
*Assistant Examiner* — Santosh R Poudel
(74) *Attorney, Agent, or Firm* — Patterson + Sheridan, LLP

(57) ABSTRACT

Techniques are disclosed for restoring a system volume on a computing system without requiring the system volume to be fully restored prior to being used or requiring the use of a dedicated recovery environment (e.g., the WinPE or BartPE environments). Instead, the computing system is booted directly from the restore image or by redirecting I/O interrupts to the restore image. That is, when user initiates a restore process, the system boots from the backup itself. Once booted, a background process can complete the restore process.

14 Claims, 10 Drawing Sheets

(56) References Cited

U.S. PATENT DOCUMENTS

| | | | |
|---|---|---|---|
| 2009/0300305 A1* | 12/2009 | Liu | G06F 11/1451 711/162 |
| 2009/0327367 A1* | 12/2009 | Mehra et al. | 707/205 |
| 2010/0023561 A1* | 1/2010 | Zlotnick | 707/203 |
| 2011/0218966 A1* | 9/2011 | Barnes et al. | 707/645 |
| 2012/0054744 A1* | 3/2012 | Singh et al. | 718/1 |
| 2012/0151136 A1* | 6/2012 | Hay et al. | 711/114 |
| 2012/0272095 A1* | 10/2012 | Liu | G06F 8/665 714/6.1 |
| 2012/0284494 A1* | 11/2012 | Funk et al. | 713/2 |
| 2013/0024726 A1* | 1/2013 | Andrews et al. | 714/15 |
| 2013/0219161 A1* | 8/2013 | Fontignie et al. | 713/2 |
| 2014/0013096 A1* | 1/2014 | Liverance et al. | 713/2 |

\* cited by examiner

METHOD AND SYSTEM FOR INSTANT RESTORE OF SYSTEM VOLUME FROM A BACKUP IMAGE

BACKGROUND

1. Field

Embodiments of the invention generally relate to techniques for restoring a system volume from a backup. More specifically, embodiments presented herein provide techniques for performing instant restore by booting a system directly from a backup image and then completing the restore process as a background task.

2. Description of the Related Art

A storage device (e.g., a conventional magnetic disk drive) providing a primary system volume for a computer can fail for a variety of reasons. In large data centers, e.g., disk drives typically have a known "mean time between failure" providing an average of how frequently a disk drive is expected to experience a hardware failure. As another example, data stored on a system volume can be corrupted, deleted, overwritten, or otherwise rendered unusable in many ways. When these events occur, an administrator may have a few options for how to restore a system volume when needed. Restoring a system volume typically requires booting into a recovery environment using a recovery disk storing a limited operating environment, e.g., a WinPE/BartPE environment booted from a CD-rom.

Creating and distributing such disks is a task unto itself. Moreover, restoring a primary system volume using this approach can require some time before the end user can have the restored system available for use. For example, while booted to the limited recovery environment, the user has to wait until the complete backup image is copied to a system volume before doing anything with the system. Once the restore is complete, the user then reboots the system into the primary operating environment. Depending on the size of the backup image, this approach can create a significant downtime for a computer system. In cases where the system being restored provides significant applications/data (e.g., a server for a small business), this downtime can be substantially disruptive.

Similarly, some restore processes can restore a system volume from a backup image located over a network. However, as with a local backup store, the network approach also requires booting into recovery environment (e.g., WinPE) to perform the restore process.

SUMMARY

One embodiment presented herein includes a method for restoring a system volume from a backup image. This method may generally include prior to launching a boot loader on a computing system, receiving an indication to restore the system volume from the backup image. This method may also include redirecting an interrupt associated with disk I/O to a redirector function configured to perform read operations directed to the system volume from the backup image and launching the boot loader. The boot loader is configured to load an operating system stored in the backup image.

Still another embodiment includes method for restoring a system volume. This method may generally include, prior to launching a boot loader on a computing system, receiving an indication to restore the system volume from a virtual hard disk (VHD). This method may also include launching a disk filter driver configured to attach to a driver configured to perform disk I/O from the VHD, wherein the disk filter driver is configured to perform read operations directed to the system volume by reading from the VHD and to perform write operations by writing to the system volume. After booting an operating system stored on the VHD, completing the restoring of the system volume from the backup image by copying disk sectors from the VHD to the system volume.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
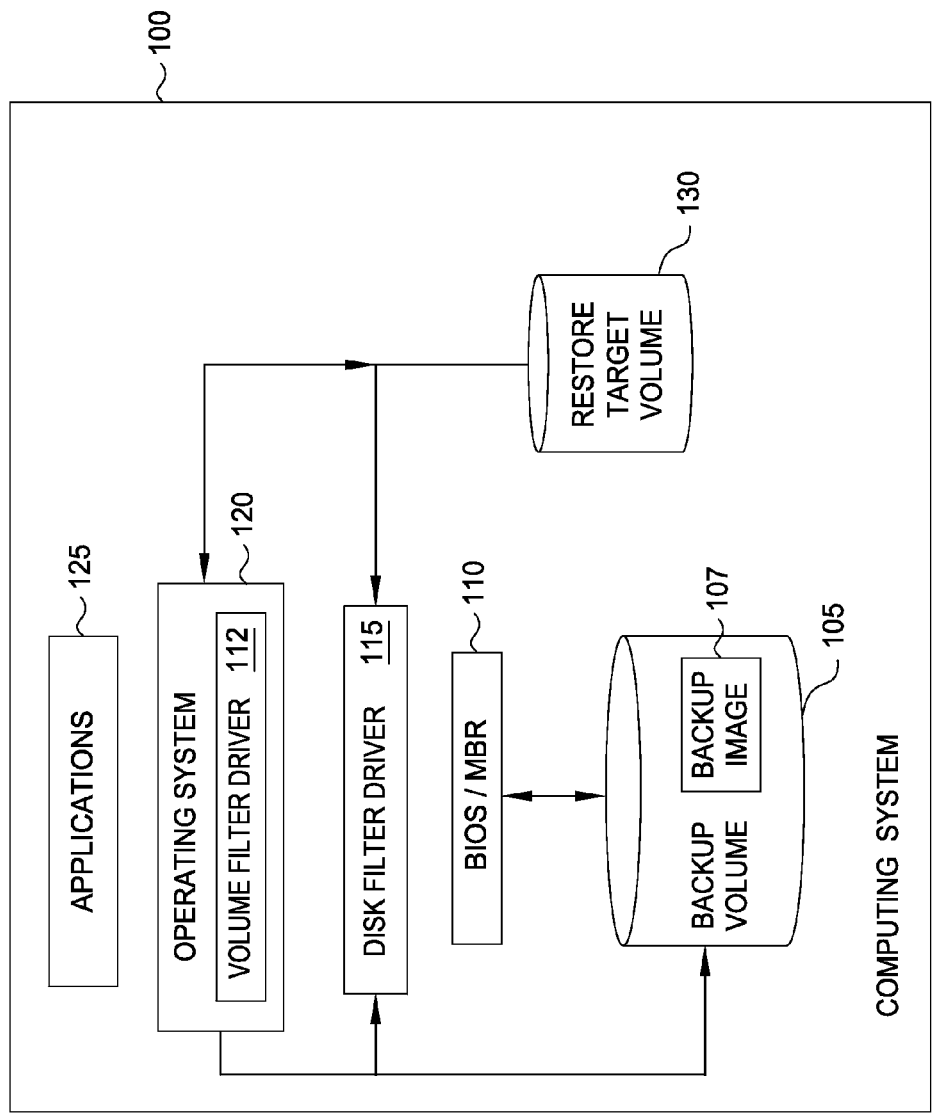
FIG. 1 illustrates an example computing environment configured to provide a pre-boot instant restore of system volume, according to one embodiment.

Embodiments of the invention provide techniques for restoring a system volume on a computing system without requiring the system volume to be fully restored prior to being used or requiring the use of a dedicated recovery envito the restore image. That is, when user initiates a restore process, the system boots from the backup itself. Once booted, a background process can complete the restore process.

In one embodiment, the backup image may be stored on a local storage volume of the computing system (or accessed over a USB connection). When the user boots the system, the BIOS may allow a user to specify to boot the system in a restore mode. In such a case, the MBR (master boot record) may include code to hook interrupt 13 (INT13) with a redirector function (sector read function). The redirector function may be generally configured to read from the backup image when requests to read the boot disk sector are issued. That is, when the system makes a read request, the INT13 hooked by the redirector function may read data from the backup image. Once the operating system driver takes over for disk I/O, read operations are performed by reading from the backup volume, while write operations are made to the volume being restored. That is, the operating system driver may determine the correct volume (either the backup image or volume being restored) to satisfy a given read or write I/O request.

The INT13 hook may be implanted prior to passing control to a boot manager (e.g. ntldr/winload) for loading the operating system kernel. Doing so ensures that all sector reads for the boot disk sector are read from the system volume backup image. The redirector function may read disk sectors from a backup image stored on local device (USB/local/flash disk in case of BIOS). Every sector read from the image through redirector function will also be written to the active disk thereby initiating the restore process. That is, the redirector function may perform a copy-on-read process to begin restoring a system volume at the same time the system is being booted from the backup image. This approach allows the boot manager to load all configured drivers before giving control to the operating system kernel. In other embodiments, the instant restore process may start immediately after booting, after the operating system kernel is loaded, or upon user selection of destination drive. Alternatively, a user could select the destination disk as an option using a custom bootloader, allowing instant restore to commence during boot up process itself.

Once the operating system kernel takes over (transitioning from real mode to protected mode), the I/O redirection and restore process may be managed by a disk filter driver stored in the backup image. That is, once the basic system is up, a restore service will start restore of remaining sectors from the backup image at low priority in the background.

In another embodiment, the backup image may be stored in a virtual hard disk (VHD) format. As is known, some operating systems (e.g., Windows® Server 2008R2) can be booted directly from a VHD file as though it were a physical disk. In such a case, a user may boot a system being restored from the VHD file by specifying to restore a given target volume using a system image stored in a VHD file that contains the backup image. Of course, other backup image or virtual disk formats may be used. In this embodiment, to perform a restore process, a disk filter driver attaches to the VHD driver exposing the backup image of a system volume contained in the VHD file. The disk filter driver loads with the kernel during system boot and monitors I/O during system boot. For every read I/O to the VHD, the disk filter driver reads data from the VHD before passing it to an upper layer (i.e., to the requesting process the read I/O). The disk filter driver also restores data read from the VHD to a target location (e.g., to a primary system volume). For every write I/O, the disk filter driver redirects the write I/O to a target location directly. That is, to perform the restore process, the disk filter driver generally processes read requests by reading from a block from the VHD file (until that block is restored, after which reads are sent to the restored volume) and generally performs write requests by writing to a block on the system volume (and marking that block as having been restored following a write). Other blocks on the VHD blocks are restored at a low priority in the background. Once the complete system volume is restored, the disk filter driver may transition into a pass-through mode. Alternatively, a volume filter driver could perform the restore process, i.e., rather than configure the low level disk filter driver to perform the restore process, an operating system level volume filter driver could restore specific volumes from the backup image.

In still another embodiment, the restore volume may be accessed over a data communications network. For example, the user may select to perform a restore process where the system is booted over the network using SAN/iSCSI, etc. Once the system is booted from a backup image, a disk filter driver in the operating system performs copy-on-read operations to restore data to restore volume. In this embodiment, the restore process includes booting from the physical disk and not the backup image. The interrupt 13 (INT13) hook and later the disk filter (once the OS stack builds up) fulfill I/O for physical disk by redirecting read requests to backup image. For example, a network boot loader (e.g., gPXE) can present a backup image located on network location as a block device to the local system. In one embodiment, a custom boot loader implements logic for a block device protocol (e.g. SCSI) and also a network protocol (e.g., a TCP/IP stack configured using DHCP). Such a custom boot loader may also implements an INT13 hook like the one discussed above. Doing so allows all reads to the boot sectors to be redirected to the network storage location (as requests for iSCSI blocks). Together, this presents the backup image on the network as a block device to the local system. The INT13 hook redirects read I/Os coming to the primary system volume (i.e., the volume being restored) to the emulated disk (i.e., a VHD file mounted using the custom boot loader).

The VHD file may be exposed as a block device using two components. First, a client side component, a module of custom boot loader performs the role of an iSCSI initiator, and second, a server side component located on target destination (e.g., a network server hosting the backup VHD file. The server side component could be a iSCSI target software that can expose a backup image as a block device to the initiator. There are commercially available iSCSI target software providers. Most of them currently support VHD and VMDK both. Of course, custom iSCSI target software as detailed in RFC 3720 could be used to support other backup image types.

This way, the system still boots from the primary system volume (e.g., a physical disk 0 in a Windows® operating system environment). During initial stages of booting (i.e. loading a registry, operating system loader, kernel and dependencies, boot start drivers etc.) the custom boot loader loads the necessary files for the OS to come up and build its stack.

At some point, the operating system stops using BIOS services and the boot loader (e.g., the gPXE stack) for disk I/O. From this point, a disk filter driver included in the backup image may redirect read I/Os coming to the system volume being restored (i.e., to disk 0 in a Windows® operating system environment) to the iSCSI disk mounted by the iSCSI driver in the operating system. As noted, the iSCSI driver communicates with the iSCSI target to expose a VHD (backup image) as a block device. The disk filter driver also copies read data to the volume being restored (i.e., to disk) to accomplish a silent restore of this volume. Write I/Os to the volume being restored are written directly to this volume. In one embodiment, the VHD exposed to system being restored will be a differencing (empty) VHD created on top of a backup image VHD. Doing so allows write I/Os to be temporarily accumulated in case of a retargeted system. Write I/O happening to the volume when booted from backup image always goes to both the differencing disk (e.g., a VHD/VMDK, etc.) and the target disk. Doing so allows a system restore to be continued if the system had been shut down during an earlier instant restore in progress. The mirroring also allows the restore process to manage check-point restore. Note this approach does not require the system to be rebooted after being restored. After a complete system restore, the disk filter driver acts in a complete pass-through mode.

In another embodiment, rather than modify the network boot loader (e.g., by creating a custom version of the gPXE boot loader) to mount and boot the backup image, the system is booted from the emulated disk instead of the physical disk. Doing so avoids having to create custom boot loader (e.g., a custom version of gPXE with INT13 hook). Instead, a volume filter driver performs a copy-on-read in the background to restore data to the physical disk. Throughout the session, the system will have been booted from the networked location. In one embodiment, the networked location includes a backup image VHD behind a differencing VHD. The differencing VHD is used to capture any writes made to the backup image VHD during the restore process. As the restore process progresses, more and more data will be written to physical disk being restored. When all the data is restored, all the I/O to the network disk (i.e., the VHD file exposed as iSCSI block device) will be read from the physical disk instead of the iSCSI block device. Unlike the approach relying on a modified boot loader, the volume filter driver acts fully in redirected mode once all blocks are restored. Upon next reboot, the system can boot from the restored system volume (e.g., disk 0) instead of iSCSI disk through the gPXE stack. However, reboot is still not a requirement post restore. Alternatively, a disk filter driver could perform the restore process, i.e., rather than perform the restore process using the volume filter driver of the operating system level, a low level disk filter driver could perform restore process from the backup image.

As just described, in some embodiments, the instant restore process operates by booting from the disk being restored. However, I/O reads are redirected from that disk to the backup store. For example. the system may boot from physical disk instead of backup image and use an interrupt 13 (INT 13) to read from a backup system. In another approach, the reads may be redirected to a network backup image. In either case, once the operating system stack comes up, operating system drivers included in the backup image may perform redirection and restore.

Alternatively, for other embodiments, the instant restore process operates by booting from the backup image being restored, and then operating in a complete passive mode once the restore is complete. Here again, I/O reads are performed by reading from the backup image. At the same time, a copy-on-read process is used to perform the restore process. For example, a computing system being restored may boot from backup image instead of physical disk. In such a case, no interrupt 13 (INT13) hook is used. Instead, the system boots from the backup image, e.g., using out of the box solutions such as Windows® native boot VHD or a Sanboot process using gPXE. Once booted, the systems performs redirection and restore using volume filter driver or lower local disk filter driver.

In both cases, whether booted from the backup image or physical disk, the OS stack can run a low priority process to complete the restore process while the system executes user applications.

Note, in addition to the four embodiments specifically mentioned above, one of ordinary skill of the art will recognize that embodiments of the invention may be adapted in a variety of ways to allow a restore process to simultaneously boot a restore image and copy that restore image to a target or system volume. For example, the embodiments mentioned above may also work with UEFI firmware (in place of BIOS). A custom UEFI driver may replace the interrupt 13 (INT13 hook) In case of UEFI based systems. Also, similarly, the gPXE stack supports booting from iSCSI disk for UEFI systems Further, in the following, reference is made to embodiments of the invention. However, the invention is not limited to any of the specifically described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 illustrates an example computing environment configured to provide a pre-boot instant restore of system volume, according to one embodiment. As shown, a computing system 100 is configured to perform a restore process by booting a backup image 107 stored on a backup volume 105. Illustratively, the backup image 107 on the backup volume 105 is to be restored to a target volume 130. To boot computing system 100, a user specifies, e.g., by accessing a BIOS manager, to boot from a specified restore volume. Note, in one embodiment, the restore process can be automated, e.g., if the BIOS/MBR 110 is unable to access a operating system on a target volume 130, the BIOS/MBR 110 can initiate the restore process automatically. In other cases, a user may access BIOS interface or a boot loader may allow a user to initiate the restore process. Once initiated, in one embodiment, the BIOS/MBR 110 hooks interrupt (INT13), replacing the regular disk I/O function configured to clear this interrupt with a redirector function that manages the restore process until entering a protected mode, turning over control for disk I/O to the operating system 120 and volume filter driver 112. In one embodiment the redirector function is implemented as disk filter driver 115. The disk filter driver 115 manages interrupts generated for INT13 (I/O read request prior to entering protected mode). While computing system 100 boots, the disk filter driver 115 processes I/O read requests by reading from the backup image 107 on the backup volume 105 and processes any write requests by writing data to the target volume 130. In this example, the target volume 130 corresponds to the volume being restored, i.e., the volume to which the backup image 107 is being restored. Note, in one embodiment, the disk filter driver 115 may manage what sectors are written to during the boot process. Once a given sector is written, any subsequent reads are directed to the partially restored target volume 130. Note, one of skill in the art will recognize that different methods may be employed to embed/invoke as a custom boot loader that prompts for a recovery point to boot from, e.g., a custom MBR written to a local disk, downloading the custom MBR from the network server, writing custom MBR to USB disk and booting from the USB disk.

During the boot process, responsibility for I/O reads/writes to disk is turned over to operating system 120. In one embodiment, to complete the system restore, the backup image 107 stores a volume filter driver 112 used to manage I/O requests after taking over from the boot loader until the restore process is complete, i.e., until all disk sectors of the backup image 107 are restored to the target volume 130. Like the disk filter driver 115, the volume filter driver 112 directs I/O read requests for disk sectors that have not been restored/written to the target volume 130 to the backup image 107 of the backup volume 105. Note, the backup volume 105 and the restore target volume 130 may be different partitions on the same physical drive, different physical drives, and different storage media. For example, in one embodiment, the backup volume may 105 storing the backup image 107 may be a USB drive or optical media (e.g., a CD- or DVD-ROM disk). Once the system is booted, and while the volume filter driver 112 completes the restore process, a user may launch application 125 and interact with the computing system 100 in a manner transparent to the ongoing restore process.

Figure 2:
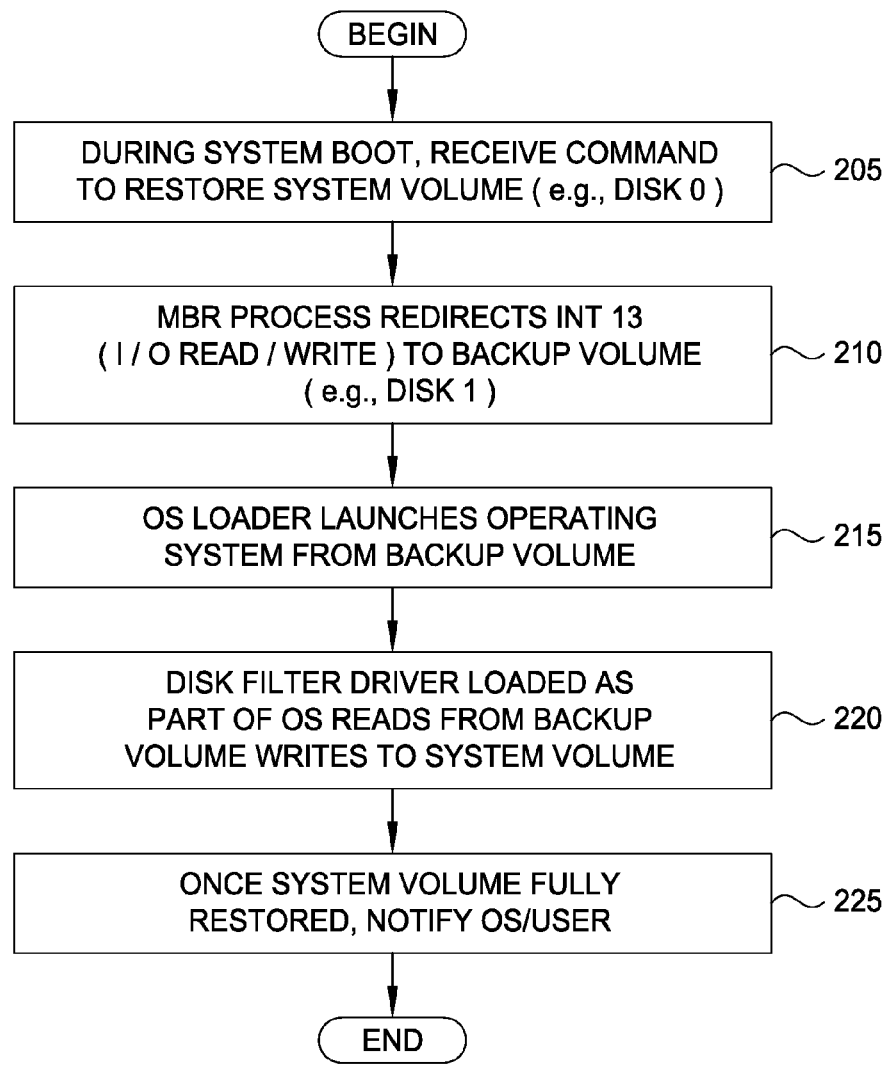
FIG. 2 illustrates a method for performing a pre-boot instant restore of system volume, according to one embodiment.

FIG. 2 illustrates a method 200 for performing a pre-boot instant restore of system volume, according to one embodiment. The method 200 generally corresponds to the restore process performed using the components shown in computing system 100 of FIG. 1.

As shown, the method 200 begins at step 205, where during an initial system boot, a computing system receives a command to restore a system volume. For example, a user interacting with a BIOS interface or a boot loader may specify that a computing system should boot from a backup image while also restoring a primary system volume using that backup image. In response, at step 210, an MBR or boot loader process hooks interrupt 13 (INT13) used to perform I/O reads from disk storage on x86 architectures, and replaces the regular interrupt handler with a redirector function, referred to above as disk filter driver 115. The redirector function intercepts I/O read requests and sends them to the backup image. At the same time, disk sectors read in response to a specific read I/O request are also copied to the volume being restored. Any write requests, and read requests received after a sector has been written to, are sent to the volume being restored. That is, once a sector is restored, the target volume is used for both reads and writes to that sector.

Once the INT13 redirector function is loaded (step 210) the boot loader continues to load the operating system image from the backup image (step 215). After control for I/O reads are turned over to the operating system, a volume filter driver continues to redirect I/O reads to the backup image and I/O writes to the volume being restored as appropriate (Step 220). At step 225, once the disk image has been fully restored, the operating system may be notified that the restore process is complete. Further, a user can continue to use the system without requiring a restart, as the volume filter driver operates in effectively a pass through mode, directing all I/O read/write requests to the restored system volume.

Figure 3:
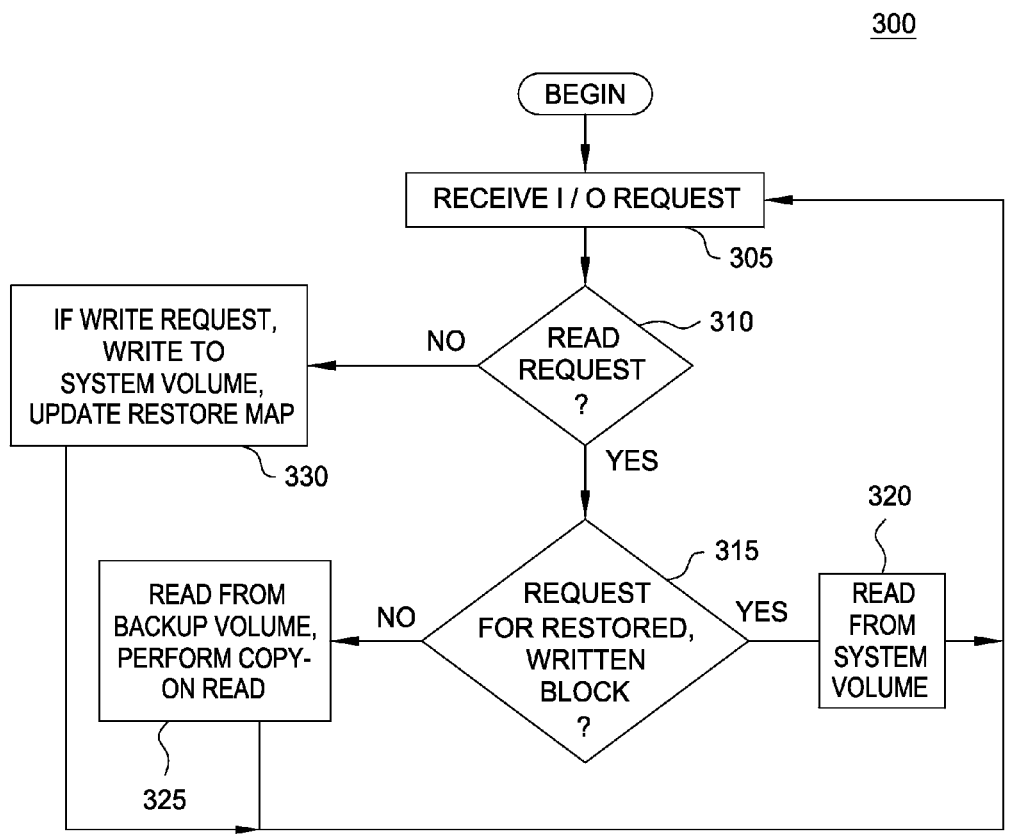
FIG. 3 illustrates a method for responding to an I/O request as part of performing a pre-boot environment-free instant restore of system volume, according to one embodiment, according to one embodiment.

FIG. 3 illustrates a method 300 for responding to an I/O request as part of performing a pre-boot environment-free instant restore of system volume, according to one embodiment, according to one embodiment. The method 300 generally corresponds to operations performed by the redirector function to clear the hooked interrupt 13 (INT13) while loading an operating system from the backup image and later by the volume filter driver after control for disk I/O is turned over to the operating system booted from the backup image.

As shown, the method 300 begins at step 305 where a disk I/O request is received. At step 310, if the I/O request is a read request, then at step 315, the driver determines whether the read request is for a sector that has previously been restored during the restore process. If so, at step 320, then the read request is performed by reading from the system volume (i.e., from the volume being restored). Otherwise, at step 325, the read request is performed from the backup volume/image. In one embodiment, the data read from the backup volume/image in response to the read request is also written to the system volume. That is, a copy on read operation is performed to both respond to the read request as well as copy the contents read in response to the read request to the volume being restored. Returning to decision 310, if the I/O request is not a read request (meaning it is a write request), then at step 330, the write request is performed by writing to the system volume (again the volume being restored). In addition, a map indicating what sectors have been restored during the restore process may be updated to reflect the write operation. That is, once a disk sector in the system volume has been written to, it should not subsequently be restored from the backup volume. Similarly, once a read I/O operation is performed against a given disk sector, subsequent reads may be directed to the restored volume.

Figure 4:
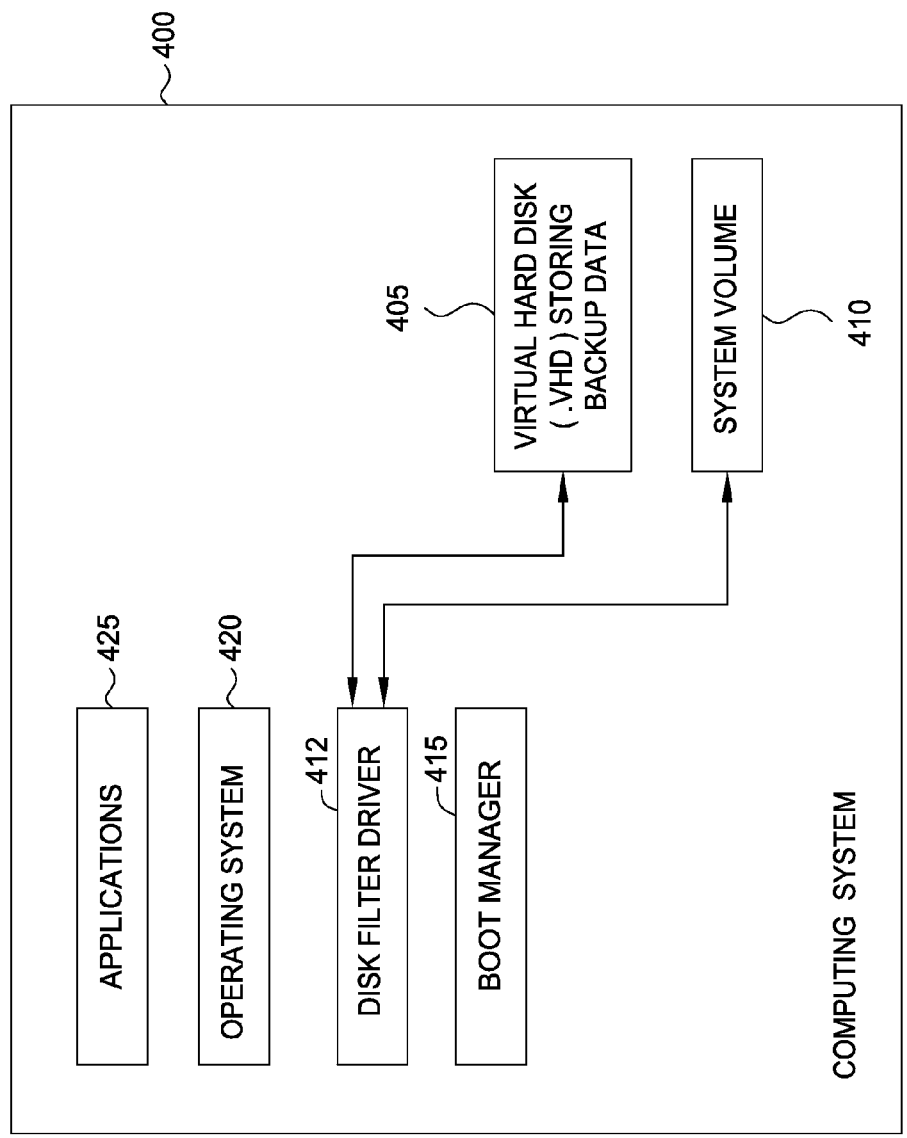
FIG. 4 illustrates an example computing system configured to provide an instant restore of system volume from a backup image captured in a virtual hard disk (VHD) format without the use of a pre-boot environment, according to one embodiment of the invention.

FIG. 4 illustrates an example computing system 400 configured to provide an instant restore of system volume from a backup image captured in a virtual hard disk (VHD) format without the use of a pre-boot environment, according to one embodiment of the invention. Like the computing system 100 of FIG. 1, a BIOS may be used to initiate a restore mode performed against a virtual hard disk (VHD). As is known, VHD provides a standardized file format for representing a virtual hard disk drive (VHD). A VHD file may contain what is found on a physical hard disk drive, such as disk partitions and a file system, which in turn can contain files and folders. Some operating systems, (e.g., Windows® server 2008 R2) allows a physical computing system (e.g., computing system 400) to mount and boot from an operating system contained within a VHD. Note, as is known, a VHD 405 may be a fully allocated VHD, with a predefined number of blocks, whether used or not, or a "sparse" or "dynamic" VHD, which uses only as many blocks as needed.

In one embodiment, a VHD 405 stores an operating system as part of a backup image. When a restore process is initiated, a boot manager 415 mounts the virtual VHD 405 as the boot disk for booting computing system 400. For example, an initial boot manager may prompt a user to specify a VHD file to restore and a system volume 410 to which the VHD is to be restored. At the same time, a disk filter driver 412 attaches to the boot manager 412 to manage I/O requests and perform the restore process. While loading an operating system 429 from the VHD 405, the disk filter driver 412 directs I/O requests to the VHD (reads, copied to the system volume 410) and writes (made to the system volume 410). For every read I/O to the VHD, the disk filter driver reads data before passing to the requesting process. The disk filter driver 412 also restores read data to a target location on the system volume 410. Write I/O operations are performed to the system volume 410. Once the operating system 420 is loaded and applications 425 are launched, the disk filter driver 412 continues to restore the system volume 410 by copying sectors from the VHD 405 to the system volume 410. Once the system volume 410 is fully restored the disk filter driver operates in a pass through mode, just redirecting all write/read I/Os to the system volume.

Figure 5:
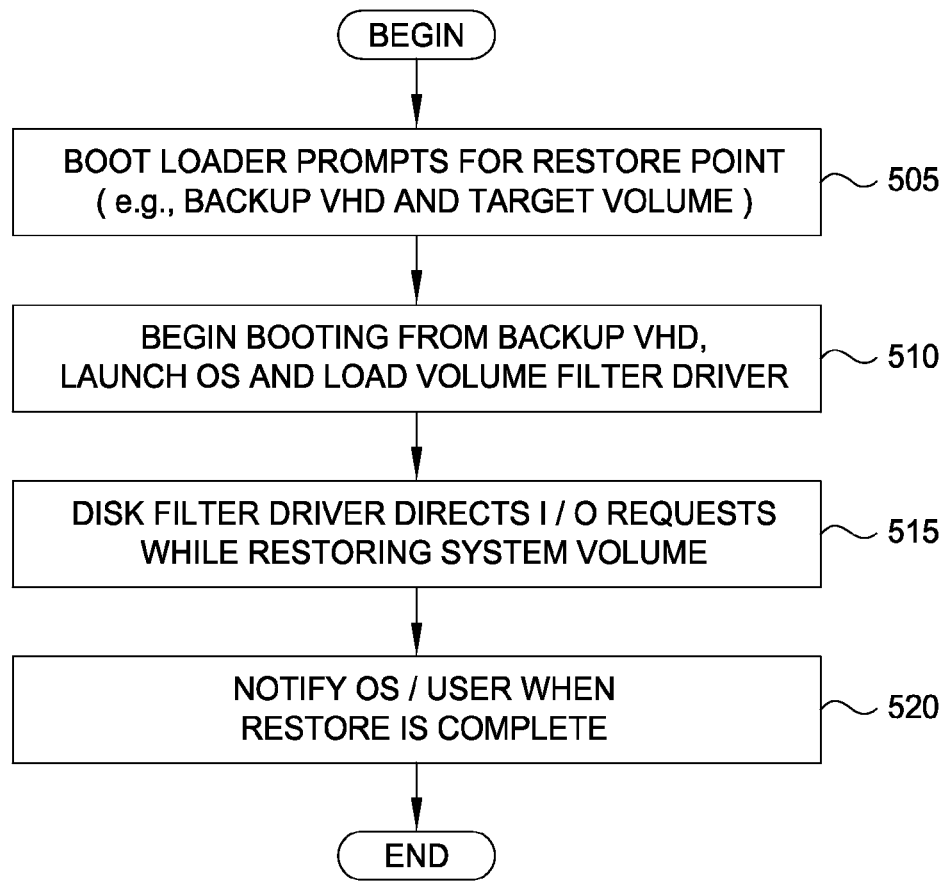
FIG. 5 illustrates a method for performing an instant restore of system volume from a backup image captured in a virtual hard disk (VHD) format, according to one embodiment.

FIG. 5 illustrates a method 500 for performing an instant restore of system volume from a backup image captured in a virtual hard disk (VHD) format, according to one embodiment. The method 500 generally corresponds to operations performed by a disk filter driver 412 to boot an operating system stored in a VHD and then restore the VHD disk image to a user-specified system volume. As shown, the method 500 begins at step 505 where a boot manager prompts a user to identify a restore point, e.g., a VHD file providing a backup image to boot/restore from and a target volume to restore the backup image to. More generally, while discussed in FIG. 5, and elsewhere herein as being a VHD formatted file, the backup image can be VHD/VMDK or any other format that is served as a block device by a commercial or proprietary iSCSI software target.

At step 510, the boot manager mounts the VHD volume and begins booting from this location as a root system volume (e.g., disk 0 in a Windows Server 2008 operating environment). At the same time, a disk filter driver associates itself with the boot manager and begins restoring the target volume (e.g., a volume labeled as disk 1 in a Windows Server 2008 operating environment). While doing so, the disk filter driver sends read requests to the VHD file and copies the results to the target volume. The disk filter driver also sends write requests to the target volume. In each case, when a sector is restored or written to, the disk filter driver tracks a sector as being restored. The disk filter driver also restores sectors in the background as a low-priority task. Once the target volume is fully restored, the disk filter driver (step 520) transitions to a pass-through mode.

Figure 6:
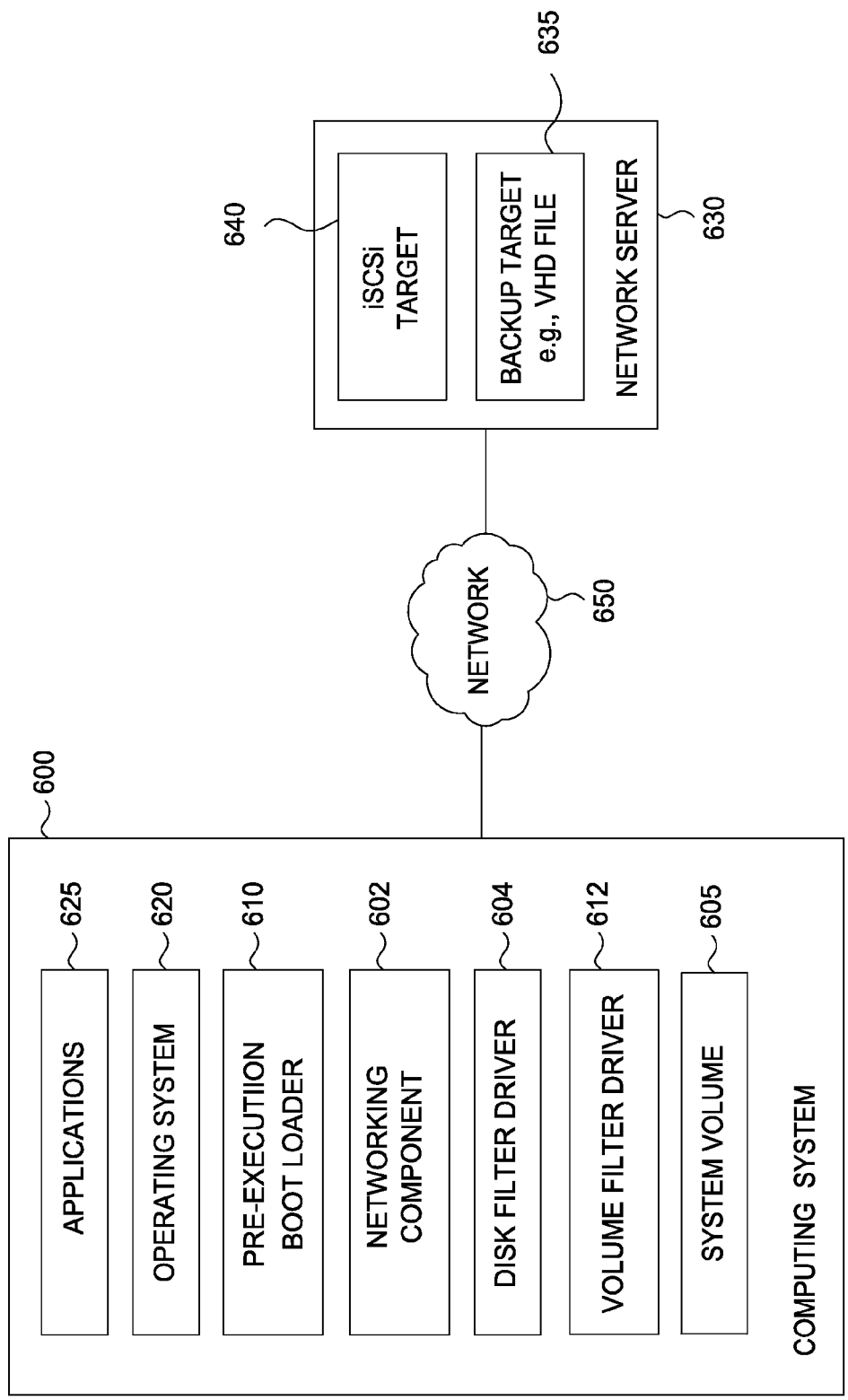
FIG. 6 illustrates an example computing system configured to provide an instant restore of system volume while booting from a backup image located on a network location, according to one embodiment.

In contrast to the approaches discussed relative to FIGS. 1-5, the approach shown in FIGS. 6-9 illustrate embodiments of the invention adapted for use with a network boot process (e.g., PXE). FIG. 6 illustrates an example computing system 600 configured to provide an instant restore of a system volume while booting from a backup image located on a network location, according to one embodiment. As shown, a computing system 600 includes a system volume 605, i.e., a volume to be restored and also includes a pre-execution boot loader 610. Further, the system 600 also includes a disk filter driver 604 and a networking component 602.

When the system 600 is booted, a user may specify to boot the system from a network location, e.g., by mounting a disk image stored as a VHD backup exposed to the boot loader 610 as an iSCSI target 640 by network server 630. In this example, the network server 630 exposes the VHD backup image 635 as an iSCSI target 640. That is, the network server 630 exposes the VHD file as a block device and translates read/write request for SCSI blocks into byte ranges from the VHD backup data 635. To restore from the backup image, the pre-execution boot loader 610 brings up a network stack (e.g., networking component 602) and obtains an IP address (e.g., via a DHCP client request). Further, the pre-execution boot loader 610 also implements an interrupt 13 (INT13) hook to send all disk I/O read requests to a redirector function of the disk filter driver 604, which operates as discussed above relative to computing system 100 of FIG. 1. Together, this presents the backup image 635, accessed over network 650, as a block device to the computing system 600, specifically, iSCSI target 640. Once configured, the pre-execution boot loader 610 may mount the iSCSI target 640 as a block device.

In one embodiment, the pre-execution boot loader 610 begins loading operating system 620 by sending iSCSI read requests to the VHD backup image 635. The network server 630 then determines what portions of the VHD file correspond to the iSCSI request and sends them in return. Further, the pre-execution boot loader 610 may be configured to copy the read data to the appropriate sectors of system volume 605, thereby initiating the restore process. Further, the pre-execution boot loader 610 may perform write requests against system volume 605. In both cases, the pre-execution boot loader 610 may manage a map of what sectors have been restored and direct reads and write I/O requests to the VHD backup 635 or system volume 605 appropriate (e.g., generally following the approach of method 300 shown in FIG. 3).

Eventually, control for disk I/O is turned over operating system 620 and the computing system 600 stops using BIOS services and gPXE stack for disk I/O. From this point onwards, the volume filter driver 612 redirects read I/O coming to physical disk 0 (the main system volume) to the iSCSI disk mounted by the iSCSI driver in the OS stack (i.e., to the VHD backup image 635). The iSCSI driver communicates with the iSCSI target, which exposes VHD backup image 635 as a local block device. The volume filter driver 612 also copies read data to the system volume 605. Similarly, the volume filter driver 612 sends write I/O to the system volume 605. In one embodiment, the VHD exposed by network server as an iSCSI target will be a differencing (empty) VHD created on top of backup image VHD 635. The volume filter driver acts as an asynchronous mirroring driver that will perform write-to-both-backup image-and-target destination volume. That is, the restore process may include performing both copy-on-read operations (copying to the restore volume for a read) and copy-on-write (copying to the volume being restored as well as writing to the differencing VHD).

In one embodiment, a hardware independent restore process may be accomplished by booting from the backup image first without commencing the restore process. Upon reboot, an operating system may prompt for drivers required on the new system. In some embodiments, user can also add new drivers to the booted system while these changes are written to a VHD differencing disk while performing a restore process. After any new drivers are installed into the booted system (i.e., added to the differencing disk), a user can kick off the restore process. Similarly, a user can also resize the volume in the backup image (changes will go to differencing disk in this case as well) after system is booted from the backup image and then kick off the restore. The restore will then create volume/partition of same size as source volume.

The system need not be rebooted after restore. After complete system restore, the volume filter driver 612 operates in a complete pass-through mode. That is, while completing the restore process, and after, the user may launch and run applications 625, without having to wait for the restore process to complete or having to restart computing system 600.

Figure 7:
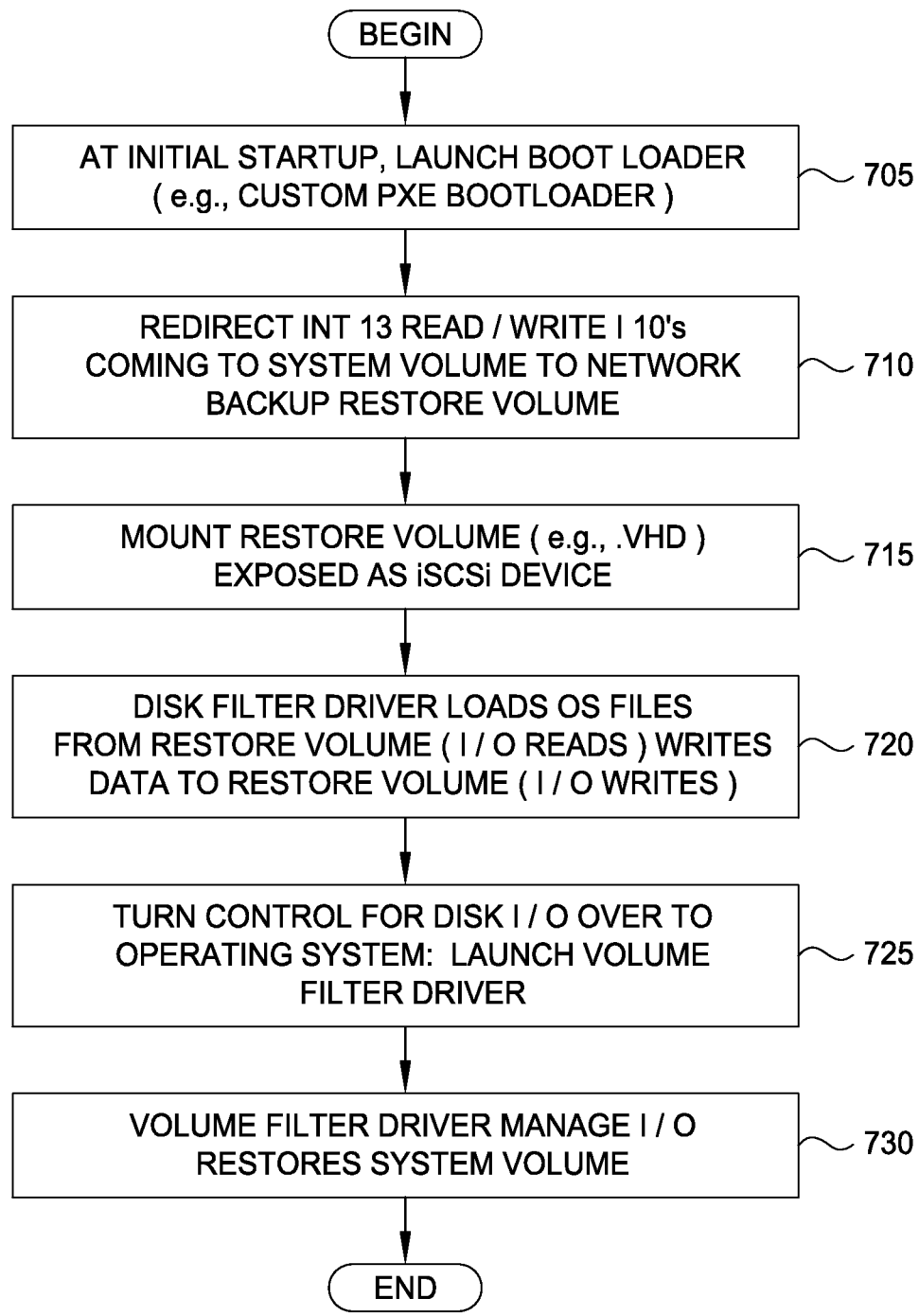
FIG. 7 illustrates a method for performing an instant restore of system volume while booting from a backup image located on a network location, according to one embodiment.

FIG. 7 illustrates a method 700 for performing an instant restore of system volume while booting from a backup image located on a network location, according to one embodiment. The method 700 generally corresponds to operations performed by a pre-execution boot loader 610 to boot an operating system from a backup image stored at a network location and to restore the backup image to a user-specified system volume.

As shown, the method 700 begins at step 705 where, during an initial startup, a computing system launches a pre-execution boot loader, e.g., a customized version of the gPXE boot loader. The customized boot loader may include a redirector function used to hook interrupt 13 (INT13) and perform I/O reads while restoring a system volume from a network backup image. As noted, the backup itself may be stored as a VHD exposed as a block device (e.g., an iSCSI target) to the computing system being booted. Accordingly, at step 710, the pre-execution boot loader redirects INT13 to a redirector function. At 715, the pre-execution boot loader mounts a volume being restored (e.g., a physical disk 0). However, once INT13 is hooked, all I/O reads are sent to a VHD file stored exposed as an iSCSI device on a network server. Further, once interrupt 13 (INT13) is hooked, the pre-execution boot loader continues to load operating system files from the restore volume (from the VHD file). The results of I/O reads are copied to the restore volume as well as passed on to the requesting process (copy on read). I/O writes are written to a differencing VHD. At step 720, the pre-execution boot loader turns control for disk I/O over to the operating system loaded from the backup store. In one embodiment, the backup image includes a volume filter driver configured to complete the restore process after taking over low-level disk I/O operations. Thus, at step 730, the volume filter driver manages I/O reads and writes while restoring the system volume from the iSCSI target. After completing the restore process, the volume filter driver operates in a pass through mode until the system is restarted. Once restarted, the computing system then boots from the restored system volume.

Figure 8:
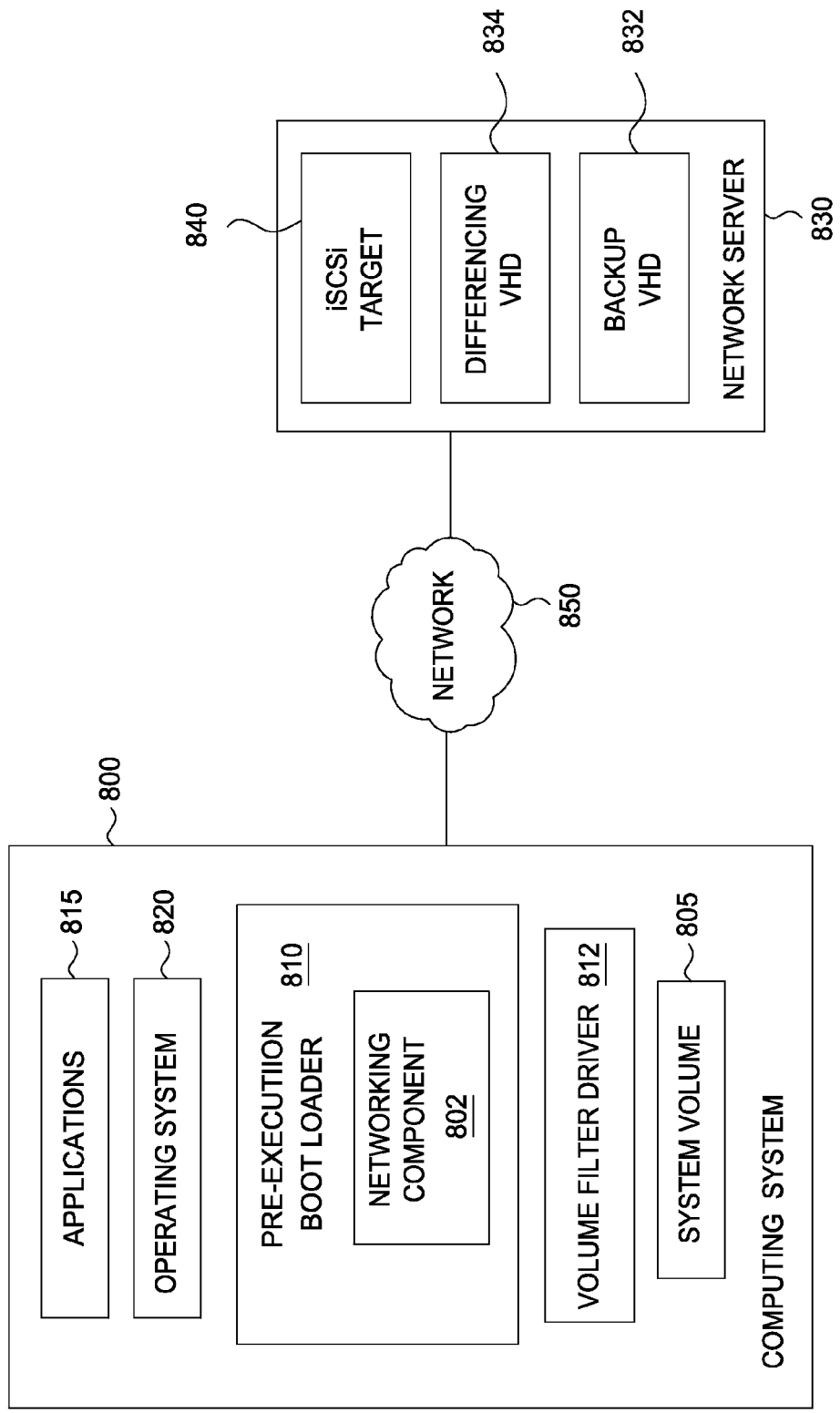
FIG. 8 illustrates an example computing system configured to provide an instant restore of system volume while booting from a backup image located on a network location, according to one embodiment.

In the embodiment illustrated in FIGS. 7 and 8, a customized boot loader is configured to perform the restore process by hooking interrupt 13 (INT13) and performing the restore process until turning over control to a volume filter driver loaded with the operating system from the backup image. In contrast, in an alternative embodiment, a computing system boots from the emulated disk instead of physical disk. As a result, the pre-execution boot loader does need to hook interrupt 13 (INT13). Once booted, a volume filter driver loaded with the operating system performs copy-on-read in the background to restore data to the restore disk. Instead of modifying the pre-boot environment, a differencing VHD is disposed in front of the backup image (itself a VHD). Like the embodiment illustrated in FIGS. 7 and 8, the VHD may be exposed to the computing system as an iSCSI target. However, while the operating system is booted (prior to switching to protected mode) I/O writes are made to the iSCSI target backed by the VHD backup file, itself behind a differencing VHD. As a result, writes are reflected in the differencing VHD, while the original backup VHD remains unchanged. Once the operating system enters protected mode, a volume filter driver begins the restore process by performing copy-on-reads to the system volume for I/O reads made to the iSCSI target and writes to the system volume for I/O writes made to the iSCSI target. The volume filter driver also manages restoring the system volume in the background. Once the volume filter driver completes restoring the system volume, it enters a complete redirect mode. That is, all I/O reads/writes are redirected to the system volume.

FIG. 8 illustrates this scenario, where an example computing system 800 is configured to provide an instant restore of system volume while booting from a backup image located on a network location, according to one embodiment. As shown, a computing system 800 includes a system volume 805, i.e., a volume to be restored, and also includes a pre-execution boot loader 810. Further, the pre-execution boot loader 810 includes a networking component 802. The networking component 802 initializes a network stack and obtains an IP address (e.g., via a DHCP client request). Once configured, the pre-execution boot loader 810 may mount the VHD backup image iSCSI target 840 as a block device. For example, the network server 830 may expose the differencing VHD 834 and backup VHD 832 as an iSCSI block device, via iSCSI target 840. Like iSCSI target 640 shown in FIG. 6, iSCSI target 840 is configured to respond to read/write requests from computing system 800 by translating requests for blocks of storage into byte ranges within the VHD backup image 832 (or differencing VHD 834).

To boot computing system 800, the pre-execution boot loader mounts the iSCSI target backed by the differencing VHD 834 and VHD backup data 832. As I/O writes occur, they accumulate in the differencing VHD 834. Doing so preserves the integrity of the VHD backup image 832, as well as allows an interrupted restore process to continue. After the system 800 enters protected mode, and operating system 820 is loaded, the volume filter driver 812 performs a restore process while users launch and execute applications 824.

Figure 9:
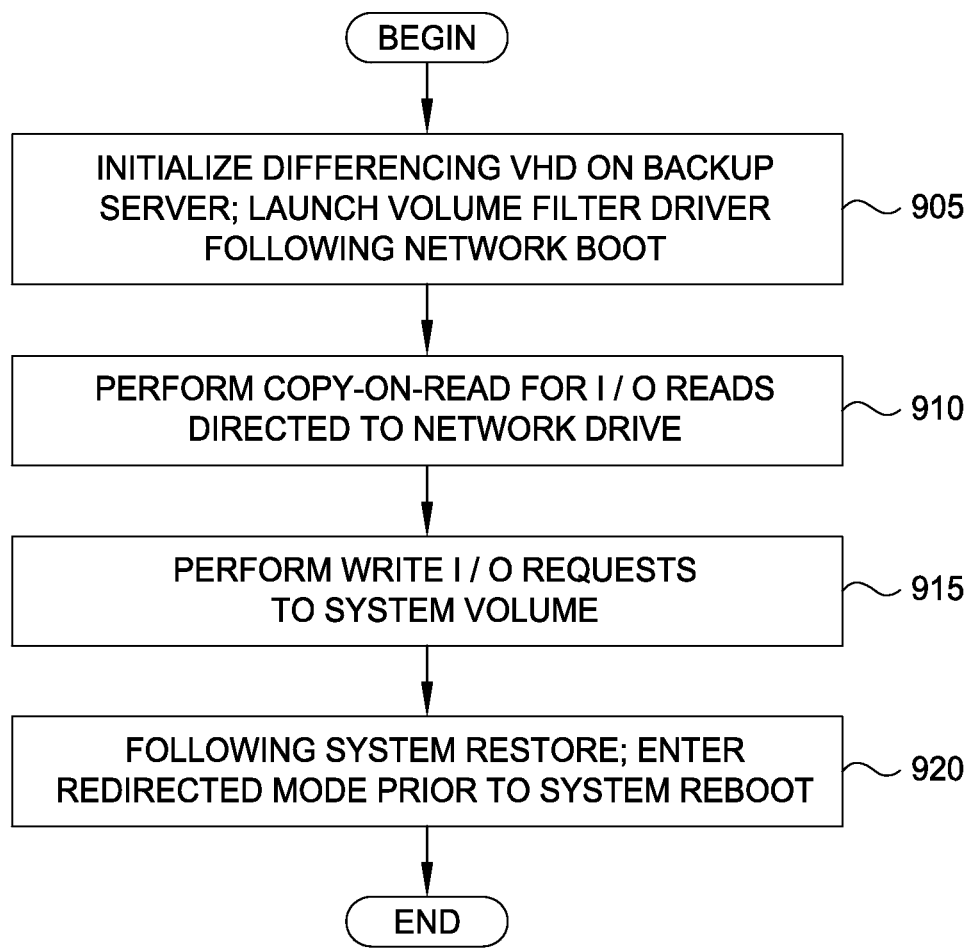
FIG. 9 illustrates a method for performing an instant restore of system volume while booting from a backup image located on a network location, according to one embodiment.

FIG. 9 illustrates a method 900 for performing an instant restore of system volume while booting from a backup image located on a network location, according to one embodiment. The method 900 generally corresponds to operations performed by a pre-execution boot loader 810 to boot an operating system 820 from a backup image 832 stored at a network location and to restore the backup image 832 to a user-specified system volume 805.

As shown, the method 900 begins at step 905 where, during an initial startup, a computing system launches a pre-execution boot loader, e.g., the gPXE boot loader or other network boot loader. As noted, the pre-execution boot loader may mount a differencing VHD exposed as an iSCSI target. The differencing VHD is initialized as a child of a parent VHD, where the parent VHD contains the backup image to boot from and to restore to a system volume. Doing so allows the differencing VHD to accumulate I/O writes that occur while booting the operating system in the backup image, without changing the backup image. After loading the operating system from the mounted backup image and switching to the protected mode, a volume filter driver is launched. At step 910, the volume filter driver performs copy-on read operations for I/O reads directed to the iSCSI target. That is, when an I/O read for a sector of the iSCSI target is performed, the volume filter driver restores the corresponding sectors on the system volume being restored. I/O writes are made to the system volume (step 915). The volume filter driver acts as an asynchronous mirroring driver that will perform write-to-both-backup image-and-target destination volume. That is, the restore process may include performing both copy-on-read operations (copying to the restore volume for a read) and copy-on-write (copying to the volume being restored as well as writing to the differencing VHD). At step 920, after completing a system restore; the volume filter driver enters a redirected mode, where all I/O reads and writes are redirected from the mounted iSCSI target to the system volume until a system reboot.

Figure 10:
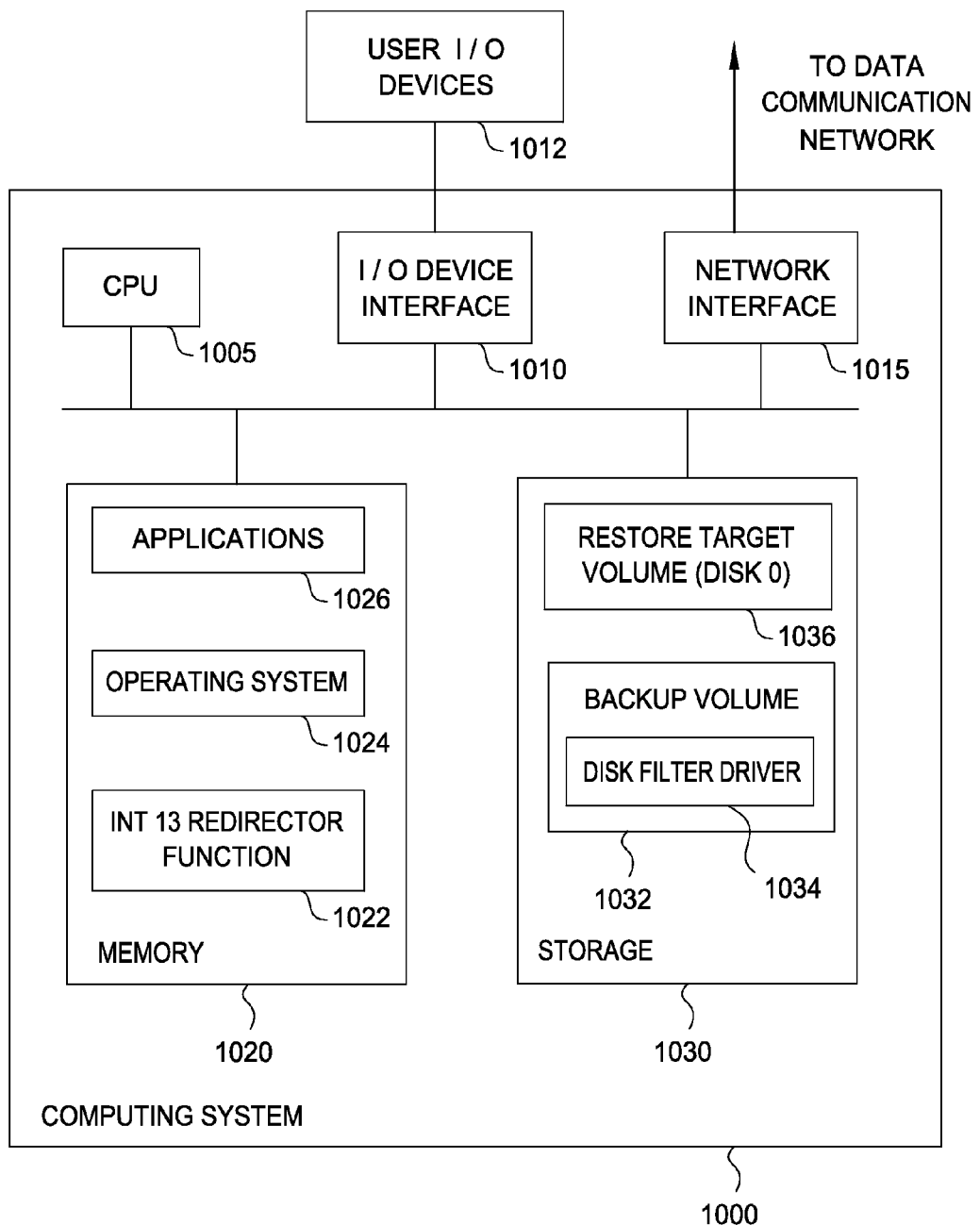
FIG. 10 illustrates an example computing system configured to perform an instant restore of a system volume, according to one embodiment.

FIG. 10 illustrates an example computing system configured to perform an instant restore of a system volume, according to one embodiment. In this example, FIG. 10 further illustrates the embodiment shown in FIGS. 1-2 for performing a system volume restore by directly booting from a backup system. Of course, one of ordinary skill in the art will readily recognize that the computing system 1000 shown in FIG. 10 may be adapted for the embodiments shown in FIGS. 3-9.

As shown, the computing system 1000 includes, without limitation, a central processing unit (CPU) 1005, a network interface 1010, a network interface 1015, a memory 1020, and storage 1030, each connected to a bus. The computing system 1000 may also include an I/O device interface 1010 connecting I/O devices 1012 (e.g., keyboard, display and mouse devices) to the computing system 1000.

The CPU 1005 retrieves and executes programming instructions stored in the memory 1020 as well as stores and retrieves application data residing in the memory 1030. The interconnect 1017 is used to transmit programming instructions and application data between the CPU 1005, I/O devices interface 1010, storage 1030, network interface 1015, and memory 1020. Note, CPU 1005 is included to be representative of a single CPU, multiple CPUs, a single CPU having multiple processing cores, and the like. And the memory 1020 is generally included to be representative of a random access memory. The storage 1030 may be a disk drive storage device. Although shown as a single unit, the storage 1030 may be a combination of fixed and/or removable storage devices, such as fixed disc drives, removable memory cards, or optical storage, and also includes network attached storage (NAS), or a storage area-network (SAN), e.g., in the case of the networked embodiments illustrated in FIGS. 6-9.

Illustratively, the memory 1020 includes applications 1026, a redirector function 1022 configured to hook interrupt 13 (INT13), and an operating system 1024. And the storage 1030 includes a restore target volume (e.g., disk 0 in a Windows® operating environment) and a backup volume (e.g., disk 1 in a Windows® operating environment). The backup volume 1032 itself includes a disk filter driver 1034. As described above, the redirector function 1022 is configured to handle I/O reads prior to turning over control for I/O over to operating system 1024 and entering protected mode. While a boot manager loads operating system 1024, the redirector function 1022 performs a copy-on-read process as part of processing I/O read requests. After entering protected mode, a disk filter driver 1034 loaded by the redirector function 1022 as part of the operating system 1024 takes over for responsibility for responding to I/O requests. Further the disk filter driver 1024 continues restoring the target volume 1036 from the backup volume 1032 until the restore process is complete.

As described, embodiments presented herein provide a variety of techniques for restoring a system volume on a computing system without requiring the system volume to be fully restored prior to being used or requiring the use of a dedicated recovery environment. Instead, the computing system is booted directly from the restore image or by redirecting I/O interrupts to the restore image. That is, when user initiates a restore process, the system boots from the backup itself. Once booted, a background process can complete the restore process.

In some embodiments, the instant restore process operates by booting from the disk being restored. For example. the system may boot from physical disk instead of backup image and use an interrupt 13 (INT 13) to read from a backup system. In another approach, the reads may be redirected to a network backup image. In either case, once the operating system stack comes up, operating system drivers included in the backup image may perform redirection and restore.

For other embodiments, the instant restore process operates by booting from the backup image being restored, and then operating in a complete passive mode once the restore is complete. For example, a computing system being restored may boot from backup image instead of physical disk. In such a case, no interrupt 13 (INT13) hook is used. Instead, the system boots from the backup image, e.g., using out of the box solutions such as Windows® native boot VHD or a San-boot process using gPXE. Once booted, the systems performs redirection and restore using volume filter driver or lower local disk filter driver While the foregoing is directed to embodiments of the present invention, other and further embodiments of the invention may be devised without departing from the basic scope thereof, and the scope thereof is determined by the claims that follow.

What is claimed is:

1. A computer-implemented method for restoring a system volume from a backup image, the method comprising:
    prior to launching a boot loader on a computing system, receiving an indication to restore the system volume from the backup image;
    redirecting an interrupt associated with disk I/O to a redirector function configured to perform certain read operations directed to the system volume from the backup image, wherein the redirector function performs a read operation by either (i) reading data from the backup image and writing the data to the system volume being restored or (ii) reading data from the system volume;
    launching the boot loader, wherein the boot loader is configured to load an operating system stored in the backup image; and
    after the boot loader turns over control for disk I/O to the operating system, launching a disk filter driver configured to perform certain read operations directed to the system volume from the backup image and to perform write operations by writing to the system volume, wherein the disk filter driver performs a read operation directed to the system volume by either (i) reading data from the backup image and writing the data to the system volume being restored or (ii) reading data from the system volume, and wherein the disk filter driver is configured to complete restoring the system volume from the backup image by copying disk sectors from the backup image to the system volume.

2. The method of claim 1, wherein the interrupt is an INT13 interrupt on an x86 architecture.

3. The method of claim 1, wherein the backup image is stored in a virtual hard disk (VHD) formatted file.

4. The method of claim 1, wherein the backup image is stored on a local partition of a storage drive on the computing system.

5. The method of claim 1, wherein the redirector function performs a copy-on-read process to copy data read from the backup image to the system volume.

6. A computer-implemented method for restoring a system volume, the method comprising:
  prior to launching a boot loader on a computing system, receiving an indication to restore the system volume from a virtual hard disk (VHD);
  launching a disk filter driver configured to attach to a driver configured to perform disk I/O from the VHD, wherein the disk filter driver is configured to perform read operations directed to the system volume by either (i) reading from the VHD and writing to the system volume or (ii) reading from the system volume and wherein the disk filter driver is configured to perform write operations by writing to the system volume;
  after booting an operating system stored on the VHD, completing the restoring of the system volume from the VHD by copying disk sectors from the VHD to the system volume, wherein the disk filter driver is configured to restore the system volume, at least in part, by performing a copy-on-read process for disk I/O reads directed to the VHD; and
  after restoring the system volume, transitioning the disk filter driver to a pass through mode which directs disk I/O read and write requests to the restored system volume.

7. A non-transitory computer-readable storage medium storing instructions, which, when executed on a processor, perform an operation for restoring a system volume from a backup image, the operation comprising:
  prior to launching a boot loader on a computing system, receiving an indication to restore the system volume from the backup image; and
  redirecting an interrupt associated with disk I/O to a redirector function configured to perform certain read operations directed to the system volume from the backup image, wherein the redirector function performs a read operation by either (i) reading data from the backup image and writing the data to the system volume being restored or (ii) reading data from the system volume;
  launching the boot loader, wherein the boot loader is configured to load an operating system stored in the backup image; and
  after the boot loader turns over control for disk I/O to the operating system, launching a disk filter driver configured to perform certain read operations directed to the system volume from the backup image and to perform write operations by writing to the system volume, wherein the disk filter driver performs a read operation directed to the system volume by either (i) reading data from the backup image and writing the data to the system volume being restored or (ii) reading data from the system volume, and wherein the disk filter driver is configured to complete restoring the system volume from the backup image by copying disk sectors from the backup image to the system volume.

8. The non-transitory computer-readable storage medium of claim 7, wherein the interrupt is an INT13 interrupt on an x86 architecture.

9. The non-transitory computer-readable storage medium of claim 7, wherein the backup image is stored in a virtual hard disk (VHD) formatted file.

10. The non-transitory computer-readable storage medium of claim 7, wherein the backup image is stored on a local partition of a storage drive on the computing system.

11. The non-transitory computer-readable storage medium of claim 7, wherein the redirector function performs a copy-on-read process to copy data read from the backup image to the system volume.

12. A non-transitory computer-readable storage medium storing instructions, which, when executed on a processor, perform an operation for restoring a system volume, the operation comprising:
  prior to launching a boot loader on a computing system, receiving an indication to restore the system volume from a virtual hard disk (VHD);
  launching a disk filter driver configured to attach to a driver configured to perform disk I/O from the VHD, wherein the disk filter driver is configured to perform read operations directed to the system volume by either (i) reading from the VHD and writing to the system volume or (ii) reading from the system volume and wherein the disk filter driver is configured to perform write operations by writing to the system volume;
  after booting an operating system stored on the VHD, completing the restoring of the system volume from the VHD by copying disk sectors from the VHD to the system volume, wherein the disk filter driver is configured to restore the system volume, at least in part, by performing a copy-on-read process for disk I/O reads directed to the VHD; and
  after restoring the system volume, transitioning the disk filter driver to a pass through mode which directs disk I/O read and write requests to the restored system volume.

13. A system, comprising:
  a processor; and
  a memory storing code, which, when executed on the processor, performs an operation for restoring a system volume from a backup image, the operation comprising:
    prior to launching a boot loader on a computing system, receiving an indication to restore the system volume from the backup image,
    redirecting an interrupt associated with disk I/O to a redirector function configured to perform certain read operations directed to the system volume from the backup image, wherein the redirector function performs a read operation by either (i) reading data from the backup image and writing the data to the system volume being restored or (ii) reading data from the system volume, and
    launching the boot loader, wherein the boot loader is configured to load an operating system stored in the backup image, and
    after the boot loader turns over control for disk I/O to the operating system, launching a disk filter driver configured to perform certain read operations directed to the system volume from the backup image and to perform write operations by writing to the system volume, wherein the disk filter driver performs a read operation directed to the system volume by either (i) reading data from the backup image and writing the data to the system volume being restored or (ii) reading data from the system volume, and wherein the disk filter driver is configured to complete restoring the system volume from the backup image by copying disk sectors from the backup image to the system volume.

14. The system of claim 13, wherein the interrupt is an INT13 interrupt on an x86 architecture.

* * * * *